(12) United States Patent
Wu

(10) Patent No.: US 7,187,542 B2
(45) Date of Patent: Mar. 6, 2007

(54) DISK DRIVE/PLAYER POSITIONING STRUCTURE

(75) Inventor: Chin-Nan Wu, Taipei (TW)

(73) Assignee: Tatung Co., Ltd., Taipei (TW)

( * ) Notice: Subject to any disclaimer, the term of this patent is extended or adjusted under 35 U.S.C. 154(b) by 483 days.

(21) Appl. No.: 10/874,274

(22) Filed: Jun. 24, 2004

(65) Prior Publication Data

US 2005/0198657 A1    Sep. 8, 2005

(30) Foreign Application Priority Data

Mar. 8, 2004    (TW) .............................. 93203444 U

(51) Int. Cl.
*G06F 1/16* (2006.01)
*G11B 5/016* (2006.01)

(52) U.S. Cl. .................. 361/685; 360/99.06; 720/643; 369/13.34

(58) Field of Classification Search ............. 360/99.01, 360/99.06, 13.34; 720/600, 657, 643; 369/13.34, 369/13.36; 361/679–687, 724–727
See application file for complete search history.

(56) References Cited

U.S. PATENT DOCUMENTS 5,111,350 A * 5/1992 Carey et al. ............. 360/99.06

2004/0125556 A1 * 7/2004 Chen et al. ................. 361/685
2005/0141189 A1 * 6/2005 Chen et al. ................. 361/685
2005/0235295 A1 * 10/2005 Hsu et al. ................... 720/600
2005/0243506 A1 * 11/2005 Robertson et al. ......... 361/685

* cited by examiner

*Primary Examiner*—Hung Van Duong
(74) *Attorney, Agent, or Firm*—Bacon & Thomas, PLLC

(57) ABSTRACT

A disk drive/player positioning structure includes a bracket, a sliding bottom plate coupled and movable forwards/backwards relative to the bracket, two sliding side plates coupled between the sliding bottom plate and the bracket for longitudinal displacement with the sliding bottom plate and transversely movable to each other relative to the bracket, and a disk drive/player mounted on the sliding bottom plate. The disk drive/player is locked that the disk drive/player is pushed backwards with the sliding bottom plate relative to the bracket and the sliding side plates are moved inwards toward each other to force locating rods thereof into respective locating holes in the disk drive/player, and is unlocked that the disk drive/player is pushed forwards with the sliding bottom plate relative to the bracket and the sliding side plates are moved outwards to disengage the locating rods from the locating holes of the disk drive/player.

5 Claims, 7 Drawing Sheets

DISK DRIVE/PLAYER POSITIONING STRUCTURE

BACKGROUND OF THE INVENTION

1. Field of the Invention

The present invention relates to a peripheral apparatus positioning structure and more particularly, to the positioning arrangement of a standard 5¼" peripheral apparatus, for example, a disk drive, CD/VCD/DVD/player, Combo drive, or the like.

2. Description of Related Art

A regular computer is generally equipped with a standard 5¼" disk drive and/or disk player. Conventionally, a standard 5¼" peripheral apparatus is fastened to the computer case with screws, i.e., the standard 5¼" peripheral apparatus is fixedly fastened to a rack with screws and then the rack is mounted inside the computer case.

FIG. 1 is a perspective view of a 5¼" computer peripheral apparatus according to the prior art. As illustrated, this 5¼" computer peripheral apparatus is a CD-Rom player 9, which comprises two sliding rails 91 symmetrically provided at two opposite lateral sides for coupling to two sliding tracks in a bracket (not shown) of the computer (not shown), and two retaining devices 92 respectively provided at the sliding rails 91 for locking the CD-Rom player 9 to the bracket after insertion of the CD-Rom player 9 into the inside of the sliding tracks of the bracket of the computer.

This computer peripheral apparatus positioning structure still has drawbacks. Because the processing and mounting procedures of the sliding rails 91 are complicated, the fabrication of the computer peripheral apparatus positioning structure requires much labor and manufacturing time, thereby resulting in a high manufacturing cost.

Therefore, it is desirable to provide a disk drive/player positioning structure that eliminates the aforesaid drawbacks.

SUMMARY OF THE INVENTION

The present invention has been accomplished under the circumstances in view. It is therefore the main object of the present invention to provide a disk drive/player positioning structure, which saves much labor and manufacturing time, thereby reducing the manufacturing cost.

To achieve this and other objects of the present invention, the disk drive/player positioning structure is comprised of a bracket, a sliding bottom plate, two sliding side plates, and a disk drive/player. The bracket comprises a bottom wall and two upright sidewalls at two sides of the bottom wall, the bottom wall defining a longitudinally extended centerline, the bottom wall comprising two longitudinal guides and two longitudinal sliding tracks respectively spaced from the centerline at two sides. The sliding bottom plate is movably supported on the bottom wall of the bracket, comprising two longitudinal sliding structures, two transverse sliding structures, and at least two upright locating rods respectively symmetrically disposed at two sides, the two longitudinal sliding structures respectively coupled to the two longitudinal sliding tracks of the bracket. The two sliding side plates are respectively coupled to the sliding bottom plate at two sides, each comprising a horizontal wall set in between the sliding bottom plate and the bracket, the horizontal wall of each the sliding side plate comprising a longitudinal guide coupled to the corresponding respective longitudinal guide of the bracket for guiding longitudinal movement of the respective sliding side plate relative to the bracket and a transverse guide coupled to the corresponding respective transverse sliding structure of the sliding bottom plate for guiding transverse movement of the respective sliding side plate relative to the sliding bottom plate, and a vertical wall uprightly extended and parallel to one corresponding respective upright sidewall of the bracket, the vertical wall of each the sliding side plate having at least one horizontal locating rod. The disk drive/player is mounted on the sliding bottom plate, comprising a bottom panel and two side panels at two sides of the bottom panel, the bottom panel comprising at least two vertically extended locating holes respectively fastened to the corresponding upright locating rods of the sliding bottom plate, the side panels each comprising at least one horizontally extended locating hole respectively fastened to the corresponding horizontal locating rods of the vertical walls of the sliding side plates. Further, the at least one of each longitudinal guide of the bracket and each corresponding longitudinal guide of the sliding side plate has one front end portion and one rear end portion, the rear end portion being relatively closer to the centerline than the front end portion. Therefore, when pushing the disk drive/player backwards after mounting of the disk drive/player in the bottom sliding plate with the at least two upright locating rods of the sliding bottom plate inserted into the corresponding respective vertically extended locating hole of the disk drive/player, the two sliding side plates are slid inwards toward each other to force the respective horizontal locating rods inserted into the respective horizontally extended locating holes of the disk drive/player and to lock the disk drive/player to the sliding bottom plate and the bracket.

Because it is easy to lock/unlock the disk drive/player simply by means of moving the disk drive/player forwards or backwards without the use of screws, the installation of the disk drive/player requires less number of parts and saves much cost and labor.

DETAILED DESCRIPTION OF THE PREFERRED EMBODIMENT

Figure 1:
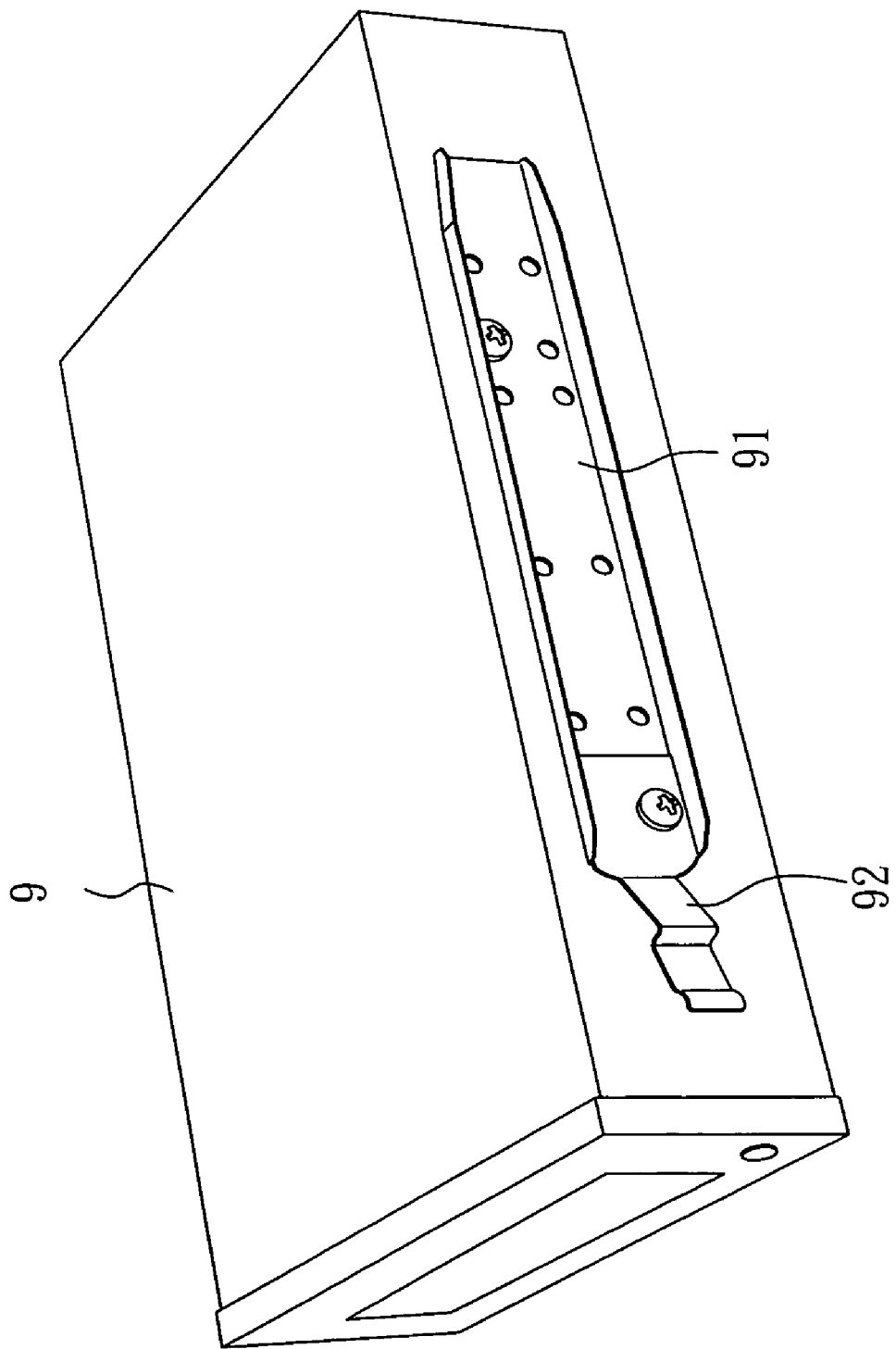
FIG. 1 is a perspective view of a 5¼" computer peripheral apparatus according to the prior art.
Figure 2:
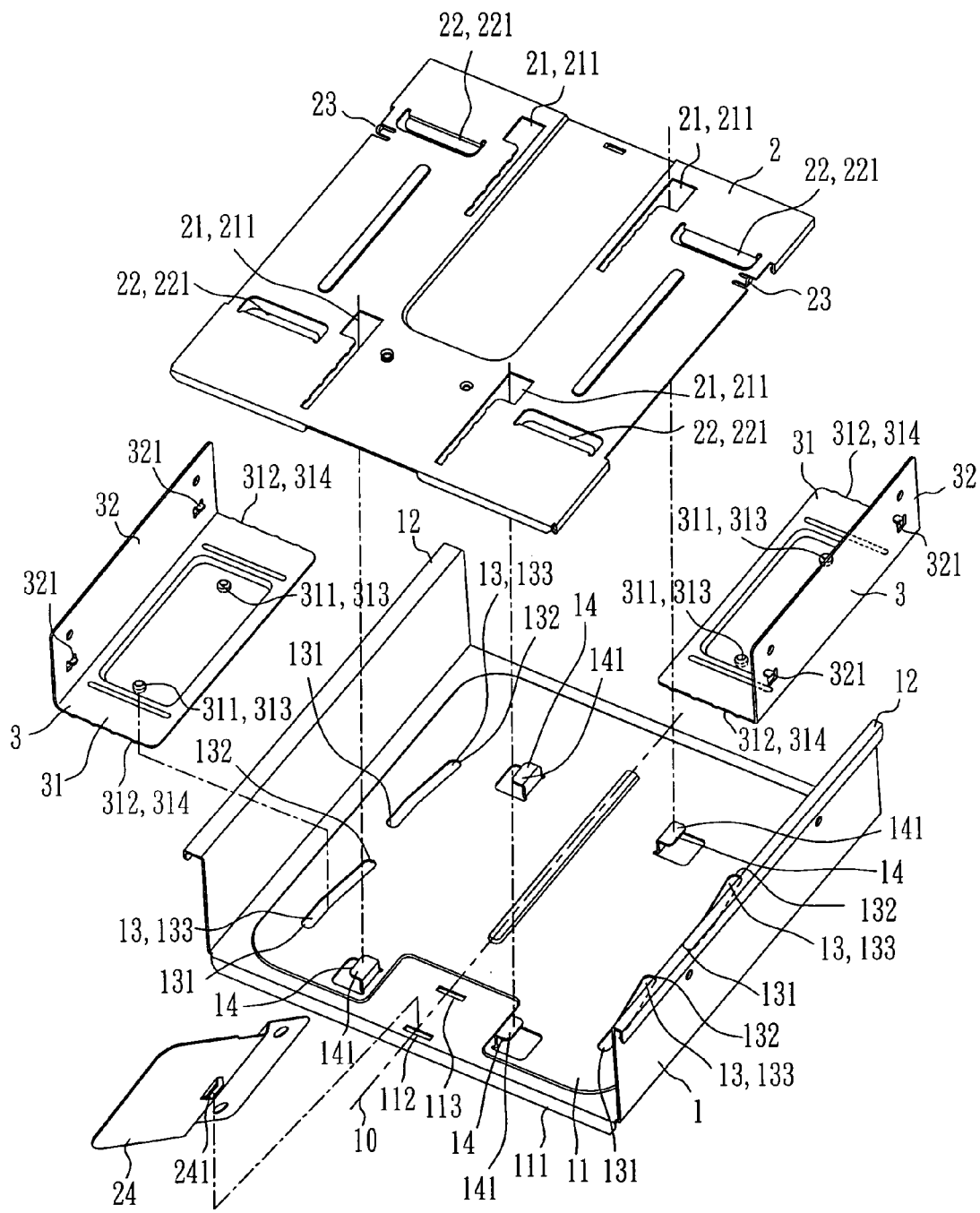
FIG. 2 is an exploded view of a disk drive/player positioning structure according to the present invention (disk drive/player excluded).
Figure 3:
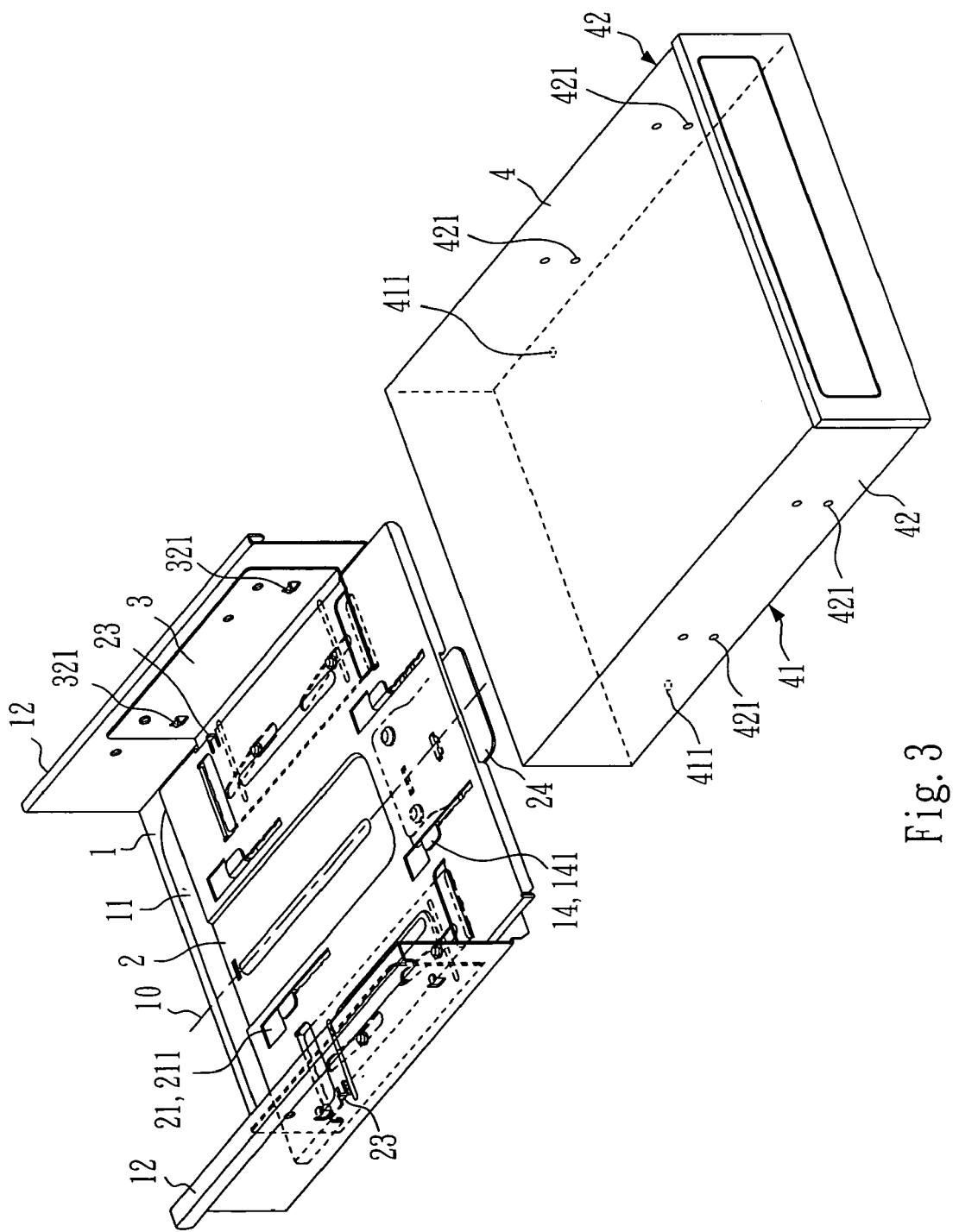
FIG. 3 is a perspective view of the disk drive/player positioning structure according to the present invention before installation of the disk drive/player in the sliding bottom plate.

Referring to FIGS. 2 and 3, a disk drive/player positioning structure in accordance with the present invention is shown comprised of a bracket 1, a sliding bottom plate 2, two sliding side plates 3, and a disk drive/player 4.

The bracket 1 comprises a bottom wall 11 and two upright sidewalls 12 at two sides of the bottom wall 11. The bottom wall 11 defines a longitudinally extended centerline 10, having two longitudinal guides 13 equally spaced from the centerline 10 at two sides, two longitudinal sliding tracks 14 equally spaced from the centerline 10 at two sides between the centerline 10 and the longitudinal guides 13, and a first locating hole 112 and a second locating hole 113 longitudinally aligned on the middle adjacent to the front edge 111 of the bottom wall 11. According to this embodiment, each longitudinal guide 13 comprises two obliquely longitudinally extended sliding slots 133. Each obliquely longitudinally extended sliding slot 133 has a front end portion 131 and a rear end portion 132. The rear end portion 132 is relatively slightly closer to the centerline 10 than the front end portion 131 for inward guiding. Each longitudinal sliding track 14 comprises two angled flanges 141 upwardly protruded from the bottom wall 11 and longitudinally aligned in a line. As stated above, two pairs of longitudinally extended sliding slots 133 and two pairs of angled flanges 141 are symmetrically provided at two sides to assure balanced sliding motion of the sliding bottom plate 2 and the two sliding side plates 3.

The sliding bottom plate 2 is movably supported on the bottom wall 11 of the bracket 1, comprising two longitudinal sliding structures 21 and two transverse sliding structures 22 respectively symmetrically disposed at two sides, two upright locating rods 23 symmetrically disposed at two sides, and a retaining spring plate 24 disposed at the bottom side. The retaining spring plate 24 has a raised retaining portion 241 selectively engageable into the first locating hole 112 or second locating hole 113 of the bracket 1.

Each longitudinal sliding structure 21 comprises two longitudinal sliding slots 211 longitudinally aligned in a line and coupled to the corresponding respective angled flange 141 of the bracket 1, for enabling the sliding bottom plate 2 to be moved in longitudinal direction relative to the bracket 1. Each transverse sliding structure 22 comprises two angled guide flanges 221 transversely downwardly protruded from the sliding bottom plate 2 and arranged in parallel.

The two sliding side plates 3 are angled plates respectively coupled to the sliding bottom plate 2 at two sides, each comprising a horizontal wall 31 and a vertical wall 32. The horizontal wall 31 is set in between the sliding bottom plate 2 and the bracket 1, having a longitudinal guide 311 and a transverse guide 312. The vertical wall 32 is parallel to one corresponding respective upright sidewall 12 of the bracket 1, having two horizontal locating rods 321.

The longitudinal guides 311 of the sliding side plates 3 each comprise two guide rods 313 respectively inserted into the corresponding longitudinally extended sliding slots 133 of the bracket 1 for guiding longitudinal movement of the two sliding side plates 3 relative to the bracket 1. The transverse guide 312 is comprised of two end edges 314 of the horizontal wall 31 of the respective sliding side plate 3. The two end edges 314 of the horizontal wall 31 of each sliding side plate 3 are respectively supported on the corresponding angled guide flange 221 of the respective transverse sliding structure 22 of the sliding bottom plate 2, for guiding transverse movement of the respective sliding side plate 3 relative to the sliding bottom plate 2.

The disk drive/player 4 is a standard 5¼" box member mounted on the sliding bottom plate 2, comprising a bottom panel 41 and two side panels 42 at two sides of the bottom panel 41. The bottom panel 41 comprises two vertically extended locating holes 411 respectively fastened to the corresponding upright locating rod 23 of the sliding bottom plate 2. The side panels 42 each comprise two horizontally extended locating holes 421 respectively fastened to the corresponding horizontal locating rod 321 of the vertical walls 32 of the sliding side plates 3.

Figure 4:
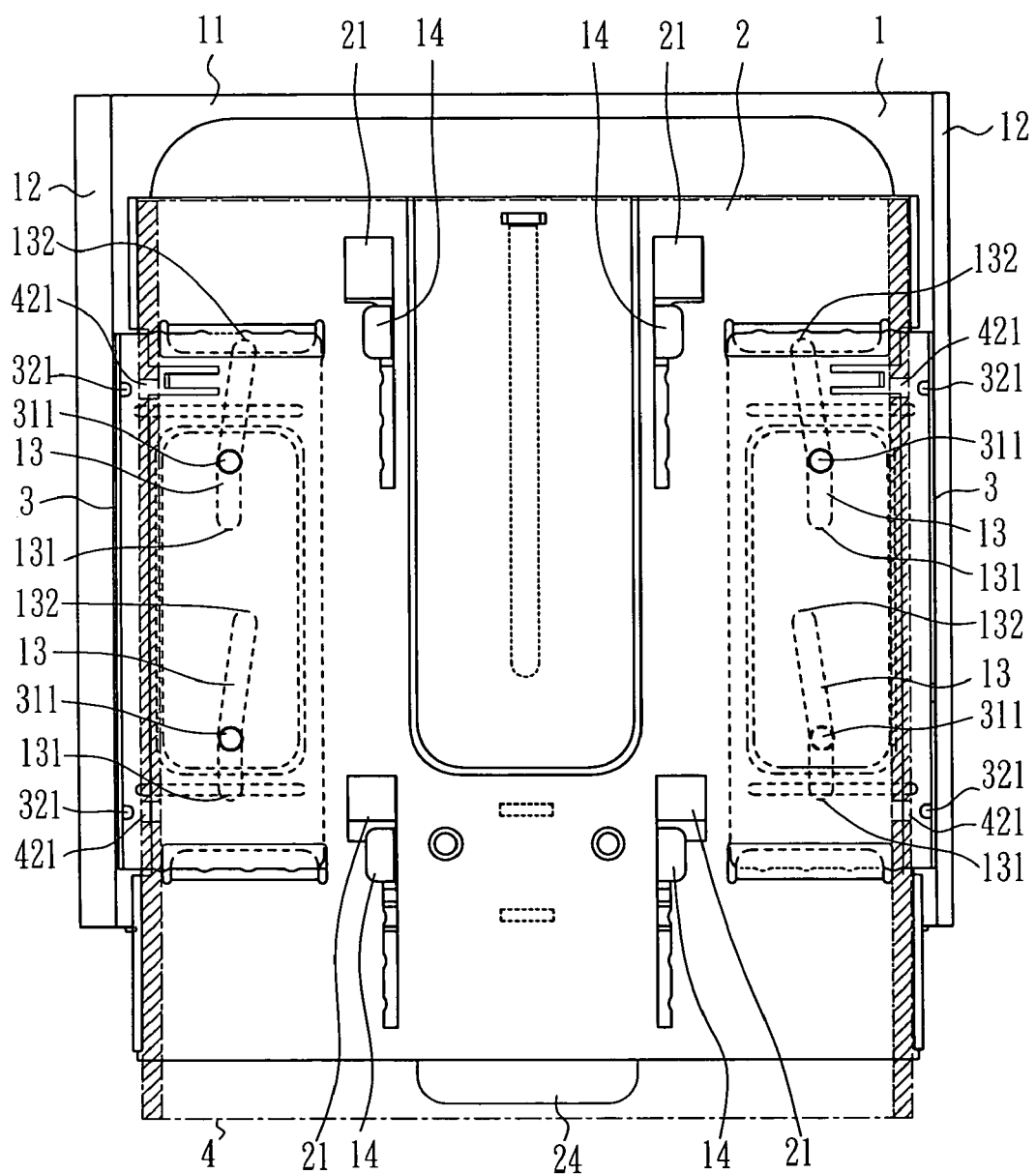
FIG. 4 is a top view of the present invention showing the disk drive/player placed on the sliding bottom plate.
Figure 5:
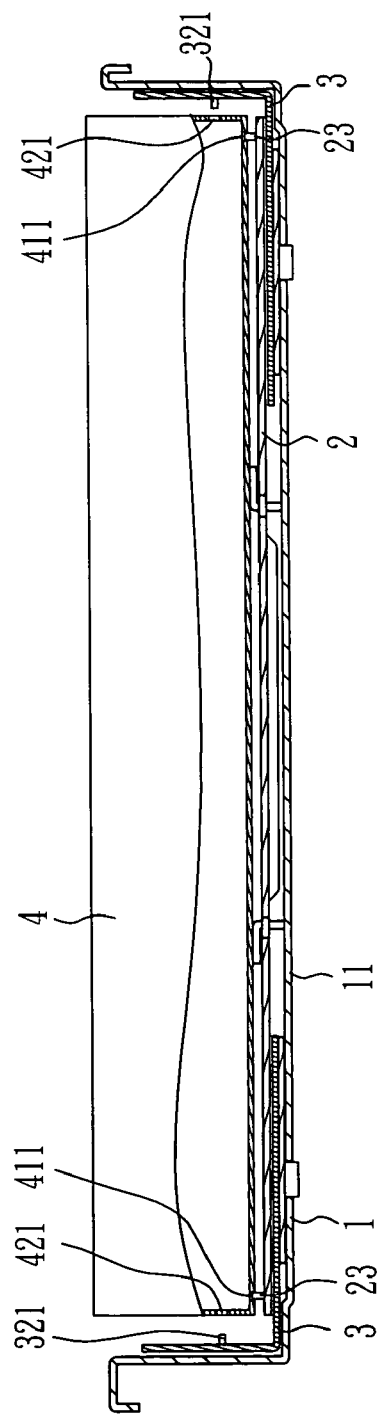
FIG. 5 is a front view of FIG. 4.
Figure 6:
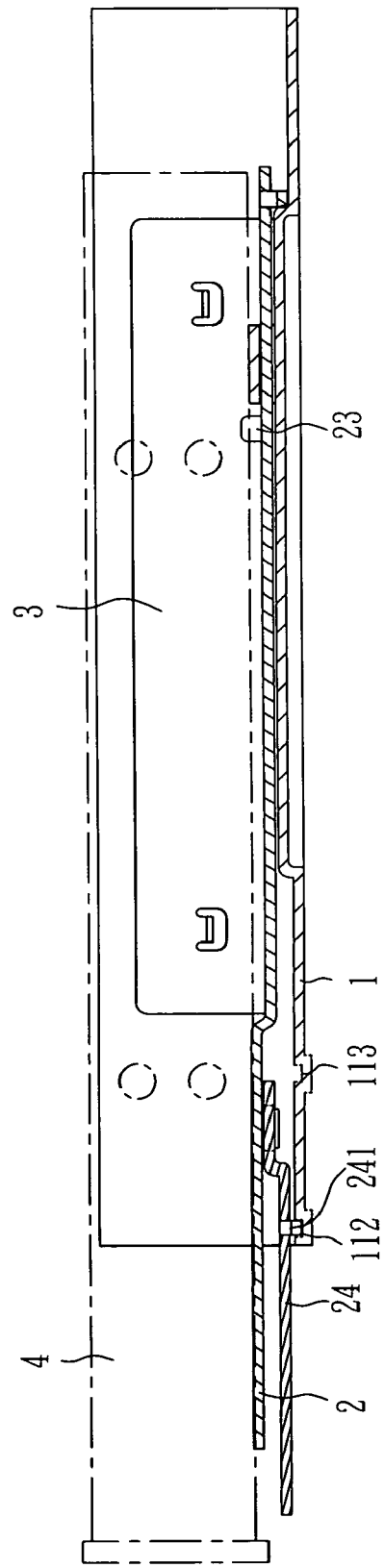
FIG. 6 is a side view of FIG. 4.

Referring to FIGS. 4~6 and FIGS. 2 and 3 again, when positioning the disk drive/player 4, the disk drive/player 4 is placed on the sliding bottom plate 2 to force the vertically extended locating holes 411 into engagement with the upright locating rods 23 of the sliding bottom plate 2. At this time, the raised retaining portion 241 of the retaining spring plate 24 of the sliding bottom plate 2 is engaged into the first locating hole 112 in the bottom wall 11 of the bracket 1.

Figure 7:
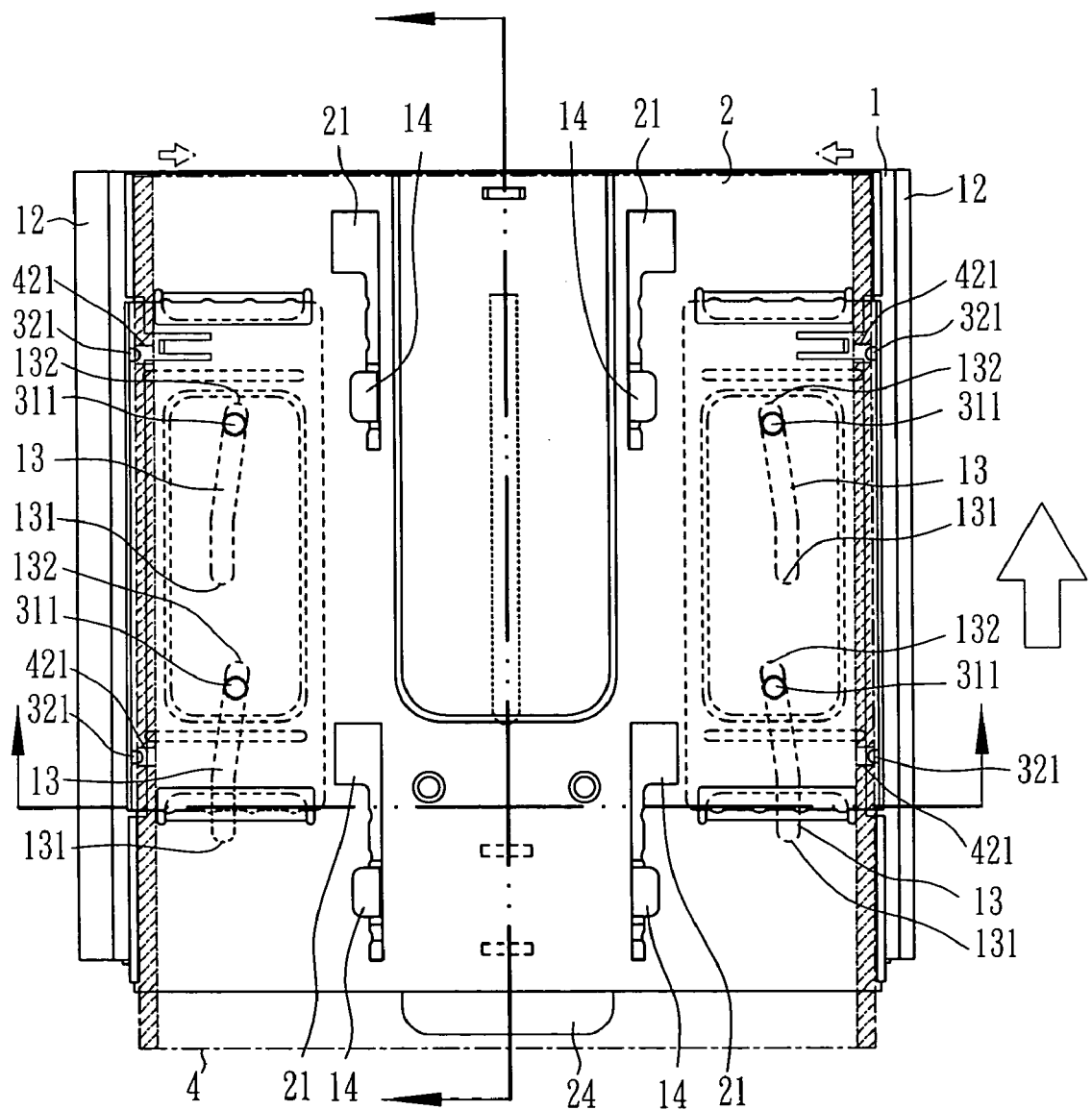
FIG. 7 is similar to FIG. 4 but showing the disk drive/player locked.
Figure 8:
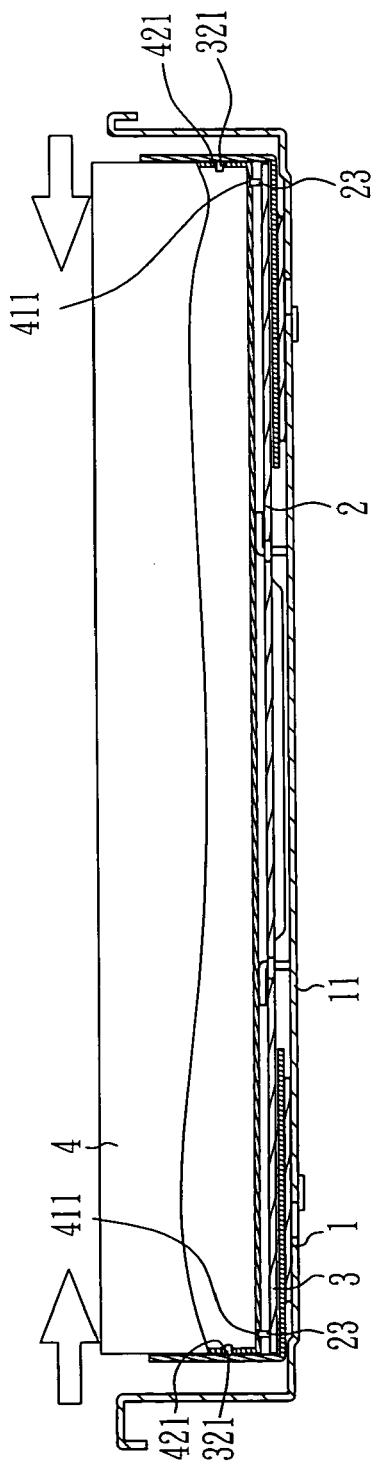
FIG. 8 is a front view of FIG. 7.
Figure 9:
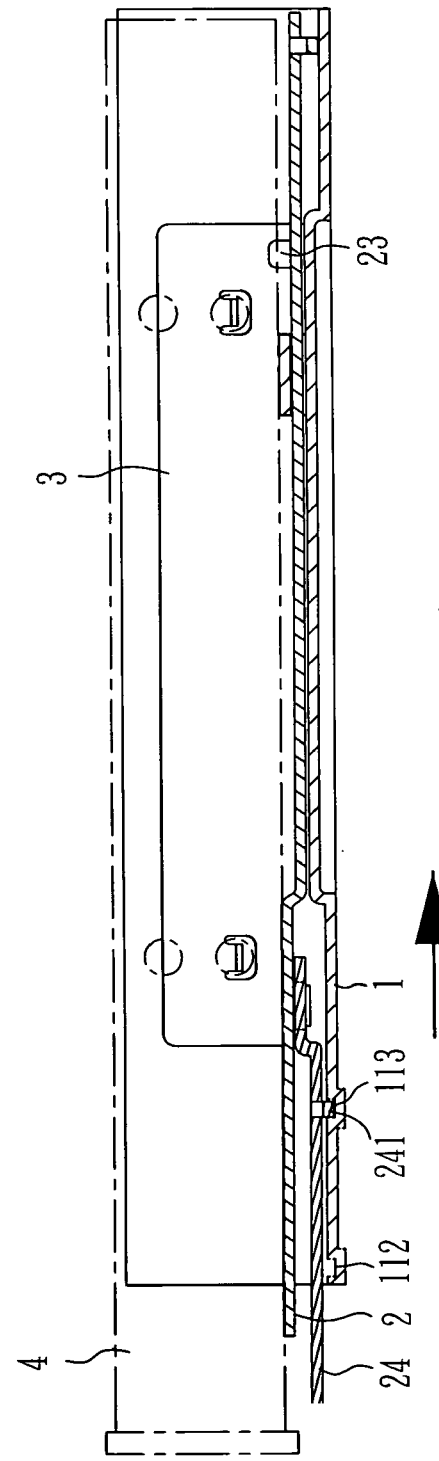
FIG. 9 is a side view of FIG. 7.

Referring to FIGS. 7~9 and FIGS. 2 and 3 again, after positioning of the disk drive/player 4 in the sliding bottom plate 2 inside the bracket 1, the sliding bottom plate 2 is pushed backwards relative to the bottom wall 11 of the bracket 1. At this time, by means of the relative sliding action between the longitudinally extended sliding slots 133 of the longitudinal guide 13 of the bracket 1 and the guide rods 313 of the longitudinal guides 311 of the two sliding side plates 3 and the relative sliding action between the angled flanges 221 of the transverse sliding structures 22 of the sliding bottom plate 2 and the end edges 314 of the transverse guides 312 of the two sliding side plates 3 and the design that the rear end portion 132 of each longitudinally extended sliding slot 133 of each longitudinal guide 13 of the bracket 1 is relatively slightly closer to the centerline 10 than the respective front end portion 131, the two sliding side plates 3 are respectively forced inwards toward each other while moving backwards. During backwardly inwards sliding motion of the two sliding side plates 3, the horizontal locating rods 321 of the two sliding side plates 3 are respectively engaged into the horizontally extended locating holes 421 in the side panels 42 of the disk drive/player 4 to hold down the disk drive/player 4. At this time, the raised retaining portion 241 of the retaining spring plate 24 of the sliding bottom plate 2 is engaged into the second locating hole 113 of the bracket 1, and therefore the disk drive/player positioning structure is locked.

On the contrary, when wishing to remove the disk drive/player 4, pull the retaining spring plate 24 upwards to disengage the raised retaining portion 241 from the second locating hole 113 of the bracket 1, and then push the sliding bottom plate 2 forwards relative to the bracket 1 to force the two sliding side plates 3 forwardly outwards, thereby causing the two sliding side plates 3 to disengage the horizontal locating rods 321 from the horizontally extended locating holes 421 in the side panels 42 of the disk drive/player 4, and therefore the disk drive/player 4 is unlocked and can be removed from the sliding bottom plate 2 and the two sliding side plates 3.

As indicated above, it is easy to lock/unlock the disk drive/player 4 simply by means of moving the disk drive/player 4 forwards or backwards without the use of screws or a sliding track assembly. Therefore, the installation of the disk drive/player 4 is easy and requires less number of parts, i.e., the invention saves much cost and labor, improving installation efficiency. Further, the invention can be employed to the installation of any of a variety of 5¼" peripheral apparatus, for example, a CD player, DVD player, Combo drive, and etc.

Although the present invention has been explained in relation to its preferred embodiment, it is to be understood that many other possible modifications and variations can be made without departing from the spirit and scope of the invention as hereinafter claimed.

What is claimed is:

1. A disk drive/player positioning structure comprising:
a bracket, said bracket comprising a bottom wall and two upright sidewalls at two sides of said bottom wall, said bottom wall defining a longitudinally extended centerline, said bottom wall comprising two longitudinal guides and two longitudinal sliding tracks respectively spaced from said centerline at two sides;

a sliding bottom plate movably supported on the bottom wall of said bracket, said sliding bottom plate comprising two longitudinal sliding structures, two transverse sliding structures, and at least two upright locating rods respectively symmetrically disposed at two sides, said two longitudinal sliding structures respectively coupled to the two longitudinal sliding tracks of said bracket;

two sliding side plates respectively coupled to said sliding bottom plate at two sides, said sliding side plates each comprising a horizontal wall set in between said sliding bottom plate and said bracket, the horizontal wall of each said sliding side plate comprising a longitudinal guide coupled to the corresponding respective longitudinal guide of said bracket for guiding longitudinal movement of the respective sliding side plate relative to said bracket and a transverse guide coupled to the corresponding respective transverse sliding structure of said sliding bottom plate for guiding transverse movement of the respective sliding side plate relative to said sliding bottom plate, and a vertical wall uprightly extended and parallel to one corresponding respective upright sidewall of said bracket, the vertical wall of each said sliding side plate having at least one horizontal locating rod; and a disk drive/player mounted on said sliding bottom plate, said disk drive/player comprising a bottom panel and two side panels at two sides of said bottom panel, said bottom panel comprising at least two vertically extended locating holes respectively fastened to the corresponding upright locating rods of said sliding bottom plate, said side panels each comprising at least one horizontally extended locating hole respectively fastened to the corresponding horizontal locating rods of the vertical walls of said sliding side plates;

wherein at least one of each longitudinal guide of said bracket and each corresponding longitudinal guide of said sliding side plate has one front end portion and one rear end portion, said rear end portion being relatively closer to said centerline than said front end portion.

2. The disk drive/player positioning structure as claimed in claim 1, wherein said bracket further comprises a first locating hole and a second locating hole longitudinally aligned on the middle adjacent to a front edge thereof; said sliding bottom plate further comprises a retaining spring plate suspending at a bottom side thereof, said retaining spring plate comprising a raised retaining portion protruded from a free end thereof and adapted to selectively engage into the first locating hole or second locating hole of said bracket.

3. The disk drive/player positioning structure as claimed in claim 1, wherein each longitudinal guide of said bracket comprises at least one obliquely longitudinally extended sliding slot; said front end portion and rear end portion are respectively formed in two distal ends of said each obliquely longitudinally extended sliding slot; the longitudinal guides of said sliding side plates each comprise at least one guide rod respectively inserted into the corresponding obliquely longitudinally extended sliding slots of said bracket.

4. The disk drive/player positioning structure as claimed in claim 1, wherein each longitudinal sliding track of said bracket comprises at least one angled flanges upwardly protruded from the bottom wall of said bracket; each longitudinal sliding structure of said sliding bottom plate comprises at least one longitudinal sliding slot respectively coupled to the corresponding angled flanges of the longitudinal sliding tracks of said bracket.

5. The disk drive/player positioning structure as claimed in claim 1, wherein each transverse sliding structure of said sliding bottom plate comprises at least one transversely downwardly protruded angled guide flanges; the transverse guides of said sliding side plates each are comprised of two end edges respectively formed at two distal ends of the horizontal wall of each said sliding side plate and respectively slide along the corresponding angled guide flanges of the transverse sliding structures of said sliding bottom plate.

* * * * *